(12) United States Patent
Kil et al.

(10) Patent No.: US 7,774,507 B2
(45) Date of Patent: Aug. 10, 2010

(54) APPARATUS FOR PROVIDING INTER-PROCESSOR COMMUNICATION USING TCP/IP IN COMMUNICATION SYSTEM

(75) Inventors: Tae-Young Kil, Seoul (KR); Sung-Chul Hong, Koyang-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1497 days.

(21) Appl. No.: 10/645,522

(22) Filed: Aug. 22, 2003

(65) Prior Publication Data

US 2004/0057458 A1    Mar. 25, 2004

(30) Foreign Application Priority Data

Sep. 11, 2002    (KR) .................. 10-2002-0055171

(51) Int. Cl.
*G06F 15/16* (2006.01)
(52) U.S. Cl. .................. 709/251; 709/206; 709/249; 709/230; 370/395.52
(58) Field of Classification Search ................ 709/251, 709/249, 230; 370/395.52
See application file for complete search history.

(56) References Cited

U.S. PATENT DOCUMENTS 5,692,126 A * 11/1997 Templeton et al. .......... 709/249
6,366,958 B1 * 4/2002 Ainsworth et al. .......... 709/230
2002/0040387 A1 * 4/2002 Lessa et al. ................. 709/206
2002/0097728 A1 * 7/2002 Hinderks et al. ........ 370/395.52

FOREIGN PATENT DOCUMENTS

KR    1020020040387    5/2002

* cited by examiner

*Primary Examiner*—Tammy T Nguyen
(74) *Attorney, Agent, or Firm*—H.C. Park & Associates, PLC

(57) ABSTRACT

An apparatus for providing inter-processor communication (IPC) using transmission control protocol/Internet protocol (TCP/IP) in a communication system, including: an Ethernet interface module for providing an interface between an Ethernet device driver and an interprocessor communication (IPC) module, determining a type of a received message, transmitting the received message to a message process module if the type of the received message is non-frame data, and queuing the received message in a corresponding mailbox corresponding to frame data if the type of the received message is the frame data; a message process module for queuing the non-frame data received through the Ethernet interface module in a corresponding mailbox; and a common application programming interface (API) module for providing an interface for basically performing data transmission and reception through the message process module, mailbox management, interprocessor communication (IPC) buffer management and an interprocessor communication (IPC) control function.

14 Claims, 4 Drawing Sheets

APPARATUS FOR PROVIDING INTER-PROCESSOR COMMUNICATION USING TCP/IP IN COMMUNICATION SYSTEM

CLAIM FOR PRIORITY

This application claims priority to an application entitled APPARATUS FOR PROVIDING INTER-PROCESSOR COMMUNICATION USING TCP/IPIN COMMUNICATION SYSTEM, filed in the Korean Industrial Property Office on Sep. 11, 2002 and assigned Ser. No.2002-55171, the contents of which are hereby incorporated by reference.

BACKGROUND OF THE INVENTION

1. Technical Field

The present invention relates to an apparatus and method for providing inter-processor communication (IPC) between processors and systems in a communication system and, more particularly, to an apparatus and method for providing inter-processor communication using transmission control protocol/Internet protocol (TCP/IP).

2. Related Art

An exemplary communication system uses an RS-422 or asynchronous transfer mode (ATM) method for inter-processor communication (IPC). The reason why the RS-422 or asynchronous transfer mode (ATM) method is used is because they are verified and stable methods. RS-422 is an Electronics Industry Association (EIA) serial line standard.

For example, a code division multiple access (CDMA) second generation (2G) system performs message communications between processors and systems using a RS-422 method based on communication inter networking (CIN), and a third generation (3G) system performs cell communication using an asynchronous transfer mode (ATM) switch and a multiplexer/demultiplexer (MUX/DEMUX). Further, a physical medium such as E1/T1 or an optical fiber is used between a base station controller (BSC) and a base station transceiver system (BTS). Message communication between processors or boards uses a bus structure. This method can be used in a system having a backboard structure and can be readily implemented. Further, the method enables relatively faster communication and its control operation is simple.

However, as described above, the exemplary communication inter networking (CIN) (2G) or asynchronous transfer mode (ATM) (3G) methods need separate control boards for the interprocessor communication (IPC). The second generation (2G) system needs high speed interconnect processor assembly (HIPA) and high capacity IPC node assembly (HINA) boards for interprocessor communication (IPC) control, and the third generation (3G) system should include asynchronous transfer mode (ATM) switch boards being ATM Switch and Fabric Board Assembly (ASFA) boards, and ATM Cell MUX/DEMUX Assembly (ACMA) boards for a multiplexer/demultiplexer (MUX/DEMUX) added to each of the predetermined number of processor boards. In these structures, flexibility and expandability of the system are degraded, and there are difficulties at the time of performing an interface with an external device. Because these high-priced boards are needed, a product price is increased, thereby degrading market competitiveness. Where a partial bus structure is used, a design of a backboard is complicated and many signals should be routed.

On the other hand, an exemplary communication method between high-speed processors or systems is configured using the bus structure or asynchronous transfer mode (ATM) method. Where the bus structure is used, because the number of signal lines between two communication nodes is increased, a design of hardware (H/W) is complicated, a system is weakened by external noise, and the probability of error occurrence is higher. Moreover, when communication between buses is performed, a board and a processor and device for separate bus control are needed because an arbiter for occupying a corresponding bus is needed. When the asynchronous transfer mode (ATM) method is used, a high-priced asynchronous transfer mode (ATM) switch and a high-priced multiplexer/demultiplexer (MUX/DEMUX) device are needed. A period of time needed for development becomes relatively longer. Also, the exemplary method is not appropriate for a compact communication system.

SUMMARY OF THE INVENTION

Therefore, the present invention has been made in view of the above problems, and the present invention provides an apparatus and method for providing interprocessor communication (IPC), which can reduce difficulties at the time of performing an external interface and increase flexibility and expandability of a system.

The present invention provides an apparatus and method for providing interprocessor communication (IPC) in a communication system, which can improve market competitiveness of an IPC-related product according to its cost-effective configuration.

The present invention provides an apparatus for providing interprocessor communication (IPC) using transmission control protocol/Internet protocol (TCP/IP) in a communication system, comprising: an Ethernet interface module for providing an interface between an Ethernet device driver and an interprocessor communication (IPC) module, determining a type of a received message, transmitting the received message to a message process module if the type of the received message is non-frame data, and queuing the received message in a corresponding mailbox corresponding to frame data if the type of the received message is the frame data; a message process module for queuing the non-frame data received through the Ethernet interface module in a corresponding mailbox; and a common application programming interface (API) module for providing an interface for basically performing data transmission and reception through the message process module, mailbox management, interprocessor communication (IPC) buffer management and an interprocessor communication (IPC) control function.

In accordance with the principles of the present invention, as embodied and broadly described, the present invention provides an apparatus for providing inter-processor communication using transmission control protocol/Internet protocol in a communication system, the apparatus comprising: an Ethernet interface module providing an interface between an Ethernet device driver and an inter-processor communication module, determining a type of a received message, transmitting the message when the determined type of the message is non-frame data, queuing the message in a first mailbox corresponding to frame data when the determined type of the message is the frame data; a message process module receiving the message transmitted by said Ethernet interface module, queuing the message received from said Ethernet interface module in a second mailbox corresponding to the non-frame data; and a common application programming interface module providing an interface for performing data transmission and reception through said message process module, for management of the first and second mailboxes, for inter-processor communication buffer management, and for an inter-processor communication control function, said common application programming interface module being in communication with said Ethernet interface module and said message process module.

In accordance with the principles of the present invention, as embodied and broadly described, the present invention provides a system providing inter-processor communication using transmission control protocol/Internet protocol, the system comprising: an access network controller being coupled to an Ethernet network and operating in accordance with software instructions corresponding to 1x evolution-data only (1xEV-DO); a wide area switching module being coupled to the Ethernet network and performing operation and state management; a data location register being coupled to the Ethernet network, performing subscriber management and providing session information to said access network controller; an element management system being coupled to the Ethernet network and performing operation and management of the Ethernet network and said data location register; a server being coupled to the Ethernet network and performing authentication for a 1x evolution-data only (1xEV-DO) subscriber; and an access network transceiver system transmitting 1x evolution-data only (1xEV-DO) data and signalling data to said access network controller through the Ethernet network; said access network controller performing a matching function with said access network transceiver system for a packet data service, and performing call processing corresponding to 1x evolution-data only (1xEV-DO); said access network controller, wide area switching module, and element management system communicating with each other by transmission control protocol/Internet protocol through the Ethernet network.

In accordance with the principles of the present invention, as embodied and broadly described, the present invention provides a method providing inter-processor communication using transmission control protocol/Internet protocol in a communication system, the method comprising: operating an access network controller in accordance with software instructions corresponding to 1x evolution-data only (1xEV-DO), the access network controller being coupled to an Ethernet network, the access network controller performing call processing corresponding to 1x evolution-data only (1xEV-DO); performing operation and state management with a wide area switching module coupled to the Ethernet network; performing subscriber management with a data location register coupled to the Ethernet network, the data location register providing session information to the access network controller; performing operation and management of the Ethernet network and of the data location register with an element management system coupled to the Ethernet network; performing authentication for a 1x evolution-data only (1xEV-DO) subscriber with a server coupled to the Ethernet network; and transmitting 1x evolution-data only (1xEV-DO) data and signalling data to the access network controller through the Ethernet network with an access network transceiver system, the access network controller performing a matching function with the access network transceiver system for a packet data service; and performing intercommunication between the access network controller, wide area switching module, and element management system by transmission control protocol/Internet protocol through the Ethernet network.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF BEST MODE OF CARRYING OUT THE INVENTION

Figure 1:
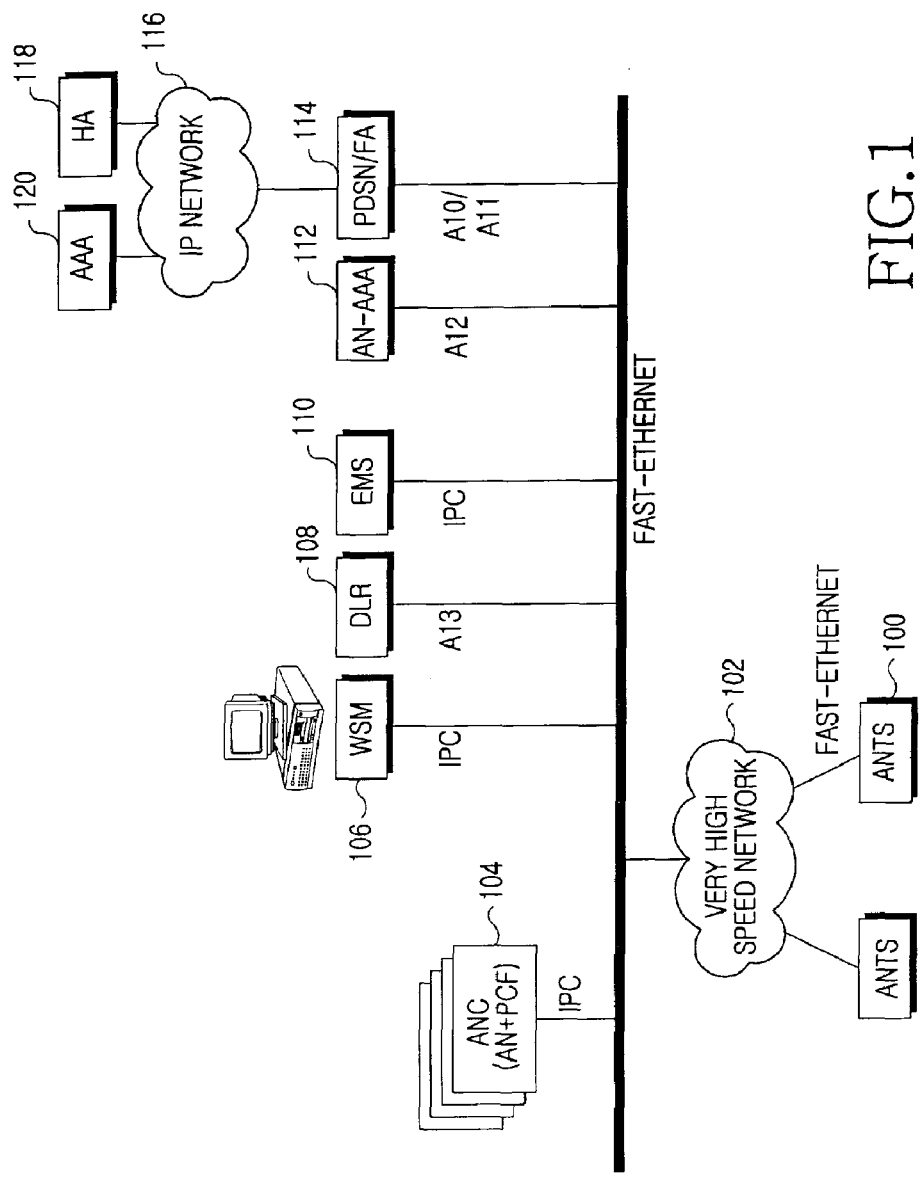
FIG. 1 is a view illustrating a configuration of a network of an IP (Internet Protocol)-based EV-DO (evolution-data only) system, in accordance with the principles of the present invention.

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Exemplars of recent efforts in the art of networking are disclosed, for example, in U.S. Pat. No. 5,692,126 for ISDN ACCESS TO FAST PACKET DATA NETWORK issued on 25 Nov. 1997 to Templeton, et al., U.S. Pat. No. 6,366,958 for NETBIOS PROTOCOL SUPPORT FOR A DCE RPC MECHANISM issued on 2 Apr. 2002 to Ainsworth, et al., and U.S. Patent Application No. 20020097728 for METHOD AND APPARATUS FOR INJECTION OF IP MULTICAST CONTENT INTO AN ATM DSL NETWORK filed 16 Nov. 2001 by Hinderks, et al. While these efforts contain merit, it is believed that further improvements can also be contemplated.

The present invention as described below relates to an apparatus and method based on interprocessor communication (IPC) using transmission control protocol/Internet protocol (TCP/IP). The transmission control protocol/Internet protocol (TCP/IP) is an open interface, which is recently popularized, and enables communication in any place where an Ethernet cable is installed. In particular, communication between boards uses the transmission control protocol/Internet protocol (TCP/IP), so that a backboard can be simply designed. On the other hand, with the development of hardware and software technologies, the transmission control protocol/Internet protocol (TCP/IP) enables high-speed and high-reliability communication in local area network (LAN) and wide area network (WAN) environments. For this reason, the transmission control protocol/Internet protocol (TCP/IP) is widely used and rapidly advanced in the networks.

Hereinafter, an embodiment of the present invention will be described. An embodiment of an IP-based EV-DO (evolution-data only) system will be described. FIG. 1 is a view illustrating a configuration of a network of an IP (Internet Protocol)-based EV-DO (evolution-data only) system, in accordance with the principles of the present invention As shown in FIG. 1, interprocessor communications (IPCs) are implemented using the transmission control protocol/Internet protocol (TCP/IP) between access network controller (ANC) boards and pieces of NE (Network Equipment) as shown in FIG. 1. As shown in FIG. 1, components of the present invention are as follows.

First, 1xEV-DO software (S/W) and a 1xEV-DO channel card are mounted in the IP-based EV-DO network, and the IP-based EV-DO network uses an Internet protocol (IP) interface between an access network controller (ANC) and the IP-based EV-DO system. Moreover, the IP-based EVDO network uses new base station transceiver system (BTS) equipment with 1xEV-DO radio frequency (RF) applications. The 1xEV-DO software is mounted in access network controllers (ANCs) 104, and the Internet protocol (IP) interface is used between the access network controller (ANC) and the IP-based EV-DO system. The software includes 1xEV-DO instructions. Moreover, the access network controllers (ANCs) 104 are based on a standard InterOperability Specification (IOS).

In this case, interprocessor communication (IPC) is changed to the transmission control protocol/Internet protocol (TCP/IP). A wide-area switching module (WSM) 106 is server equipment for a user interface for performing operation and state management of a network. A data location register (DLR) 108 is server equipment for subscriber management. An element management system (EMS) 110 is equipment for operation/management of an entire network including the data location register (DLR) 108, etc.

Figure 2:
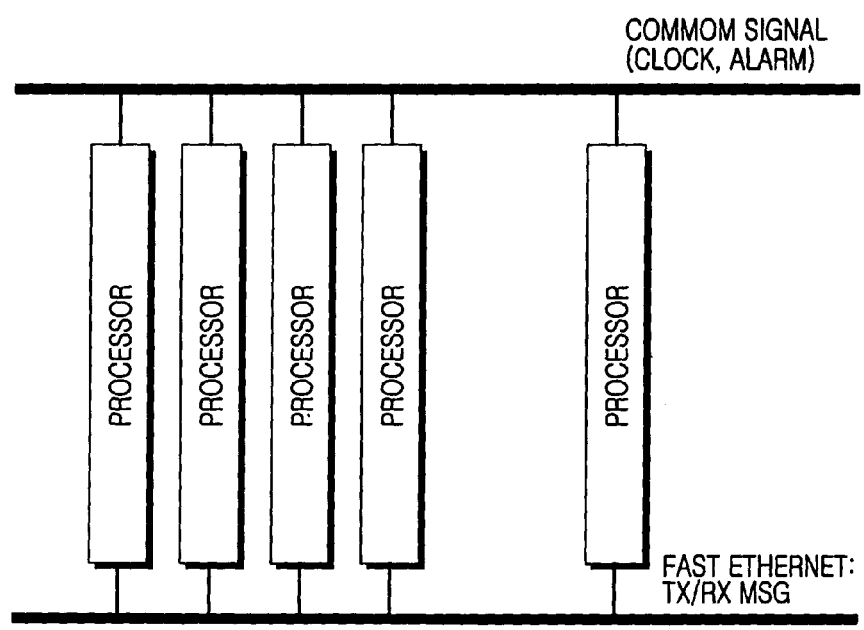
FIG. 2 is a view illustrating boards for configuring an access network controller (ANC) system, in accordance with the principles of the present invention system.

Hereinafter, the above-described components will be described in detail. FIG. 2 is a view illustrating boards for configuring an access network controller (ANC) system, in accordance with the principles of the present invention system.

An access network controller (ANC) 104 is a system arranged between access network transceiver systems (ANTSs) 100 and a packet data servicing node (PDSN/FA) 114, and performs a matching function with a data core network (DCN) and the access network transceiver system (ANTS) 100 for a packet data service. The access network controller (ANC) 104 performs call processing for 1xEV-DO, a selector function, an radio link protocol (RLP), a packet control function (PCF), etc. Further, the access network controller (ANC) 104 performs an operation/maintenance function through a connection with the wide area switching module (WSM) 106, a mobility management function through a connection with the data location register (DLR) 108, and a terminal authentication function for 1xEV-DO through a connection with a server 112 known as an access network-authorization, authentication and accounting (AN-AAA) server 112.

The access network controller (ANC) 104 is functionally configured by various types of boards. The boards transmit and receive signals such as a clock, an alarm, etc. that the boards commonly use through a backboard. A signal for message transmission between boards or systems is transferred between the boards or the systems through an Ethernet driver and a fast-Ethernet port.

An access network transceiver system (ANTS) 100 is a system arranged between the access network controller (ANC) 104 and an access terminal (AT), and supports IS-856. Further, the access network transceiver system (ANTS) 100 communicates 1xEV-DO data and signalling data with a higher-order access network controller (ANC) system. An IP-based EV-DO base station transceiver system (BTS) performs functions of air-resource management, radio frequency (RF) scheduling, overhead channel management, reverse power control, etc., for 1xEV-DO.

The data location register (DLR) 108 is software associated with the access network controller (ANC) 104. The data location register (DLR) 108 of the 1xEV-DO system performs a session control function and a mobility management function. To perform these functions, the data location register (DLR) 108 allocates a temporary identifier (unicast access terminal identifier (UATI)) to a terminal, maintains session layer information between the terminal and the system, and provides session information to the access network controller (ANC) 104. Further, the data location register (DLR) 108 receives a terminal location information update message from the terminal, manages updated location information, and uses the location information for a paging function, a keep-alive function, etc. The data location register (DLR) 108 manages information of a subnet (for example, a group allocating the unicast access terminal identifier) allocated to the terminal and a paging area, and performs addition/modification of information. To perform the above-described functions, the data location register (DLR) 108 communicates a message with the access network controller (ANC) 104 through A13 coupled to the interprocessor communication (IPC). A13 is a protocol of IOS4. x. The data location register (DLR) 108 is interfaced with the wide area switching module (WSM) 106 and a fast Ethernet to output various operator matching and operation messages.

The access network-authorization, authentication and accounting (AN-AAA) server 112 is a system connected to the access network controller (ANC) 104, and performs terminal authentication for a 1xEV-DO subscriber. The AN-AAA server 112 performs functions for access terminal authentication, international mobile subscriber identity (IMSI) allocation through high availability (HA) 118 by data replication and a structure capable of processing a real-time database, using a device for determining whether an access terminal desiring to use the 1xEV-DO network is authentic. The high availability (HA) 118 and the authorization, authentication and accounting (AAA) 120 are connected to the Internet protocol (IP) network 116, as shown in FIG. 1.

The access network-authorization, authentication and accounting (AN-AAA) server 112 communicates with an access network (AN) through a user datagram protocol/Internet protocol (UDP/IP)-based workstation and remote authentication dial-in user service (RADIUS) protocol (or DIAMETER protocol in the future), and performs a customer management center interface function and a network management center interface function for performing a connection with a network management center and data conversion. The DIAMETER protocol is an enhancement to the RADIUS protocol.

The access network-authorization, authentication and accounting (AN-AAA) server 112 provides system management, an operator interface, and a graphic user interface (GUI) for maintenance. The access network-authorization, authentication and accounting (AN-AAA) server 112 uses the remote authentication dial-in user service (RADIUS) protocol to identify a terminal's authorization, and manages a subscriber database for identifying a corresponding subscriber's authorization and other profile information. The access network-authorization, authentication and accounting (AN-AAA) server 112 is based on A12 protocol of IOS4. x.

The wide area switching module (WSM) 106 is connected to the access network controller (ANC) 104 and the fast Ethernet to output various operator matching and operation messages associated with the access network controller (ANC) 104 and IP-based EV-DO. The wide area switching module (WSM) 106 provides a GUI environment for system management and maintenance. The wide area switching module (WSM) 106 performs Program Loading Data (PLD) generation and increase/decrease and system loading to manage a configuration of the IP-based EVDO system when capacity of the wide area switching module (WSM) 106 is extended.

Figure 3:
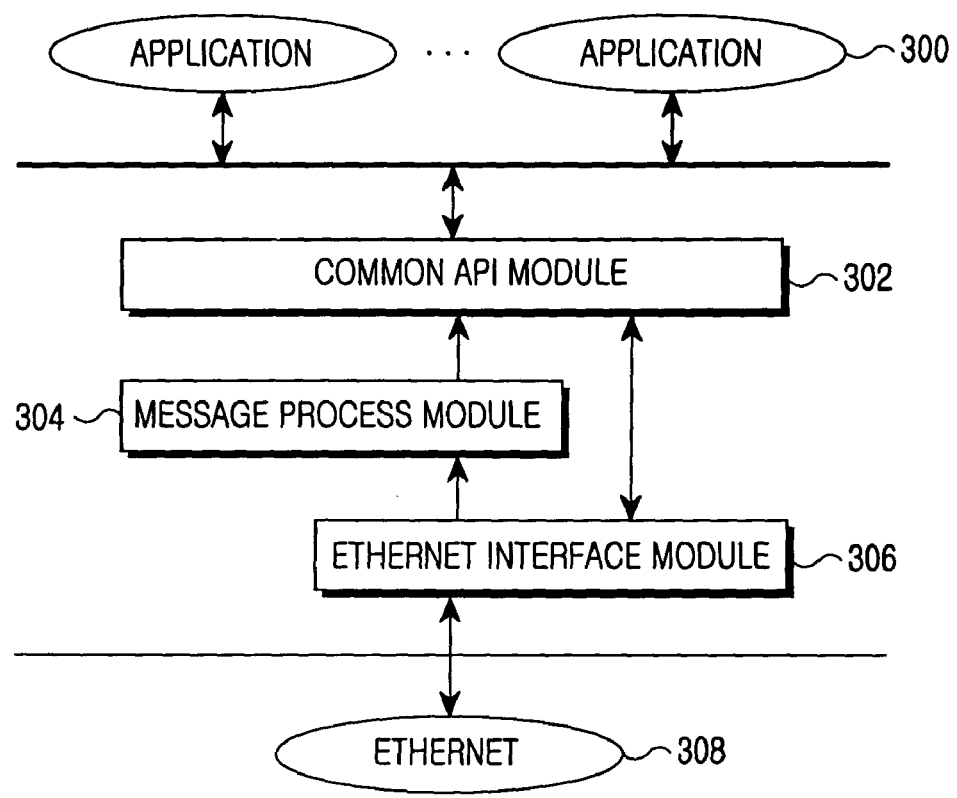
FIG. 3 is a view illustrating a configuration of an interprocessor communication (IPC) module, in accordance with the principles of the present invention.
Figure 4:
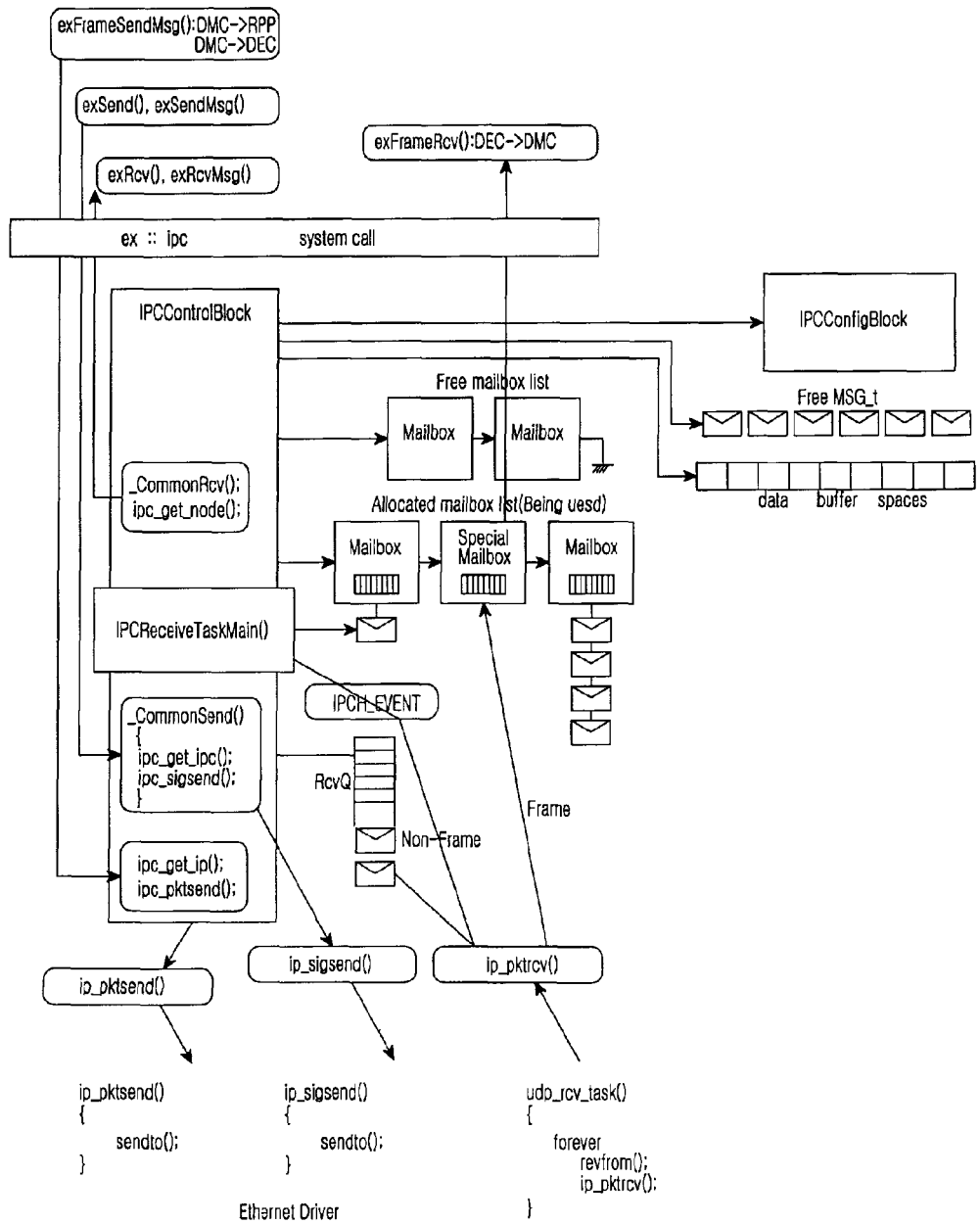
FIG. 4 is a view illustrating interprocessor communication (IPC) based on transmission control protocol/Internet protocol (TCP/IP), in accordance with the principles of the present invention.

In the network configured as described above, the interprocessor communication (IPC) using the transmission control protocol/Internet protocol (TCP/IP) in accordance with the present invention is as follows. FIG. 3 is a view illustrating a configuration of an interprocessor communication (IPC) module, in accordance with the principles of the present invention. FIG. 4 is a view illustrating interprocessor communication (IPC) based on transmission control protocol/Internet protocol (TCP/IP), in accordance with the principles of the present invention. Referring to FIGS. 3 and 4, the interprocessor communication (IPC) in accordance with the principles of the present invention will be described.

The interprocessor communication (IPC) module of FIG. 3 is a communication sub-system in the IP-based EV-DO system, and software for transmitting and receiving a message between application tasks in a node or different nodes based on the Ethernet. The interprocessor communication (IPC) module includes application tasks (application programs) 300, a common application programming interface (API) module 302, a message process module 304, an Ethernet Interface module 306, and Ethernet device driver 308, etc.

The common application programming interface (API) module 302 is a module for performing the interprocessor communication (IPC) and an interface with higher-order application programs, and provides interfaces for non-frame data communication, frame data communication, mailbox open/close, interprocessor communication (IPC) buffer allocation and return, a interprocessor communication (IPC) control function, etc. The common application programming interface (API) module 302 is arranged on a highest-order layer in the interprocessor communication (IPC), has an interface with the application programs above the module 302, and has an interface with the message process module 304 and the Ethernet Interface module 306 below the module 302.

The message process module 304 arranged below the common application programming interface (API) module 302 reads a mailbox field of non-frame data incoming through the Ethernet interface module 306 and then queues received messages in a corresponding mailbox. At this time, the message process module 304 determines the number of messages queued in the mailbox, deletes oldest messages from the mailbox and queues latest messages in the mailbox if the number of messages is greater than a predetermined number of messages. The message process module 304 queues a message and then determines whether a task of waiting for a message incoming into the mailbox exists. If the task exists, the message process module 304 wakes up a corresponding task. Otherwise, the message process module 304 performs a corresponding process.

In the interprocessor communication (IPC), the message process module 304 has an interface with the common application programming interface (API) module 302 above the module 304, and has an interface with the Ethernet interface module 306 below the module 304.

The Ethernet interface module 306 arranged below the message process module 304 in the interprocessor communication (IPC) provides an interface between the Ethernet device driver 308 and the interprocessor communication (IPC) module when an application program transmits a message to another node or receives a message from another node. The Ethernet interface module 306 determines a type of the message received. If the type of the received message is non-frame data, the Ethernet interface module 306 transfers the received message to the message process module 304. On the other hand, if the type of the received message is frame data, the Ethernet interface module 306 queues the received message in a specific mailbox corresponding to the frame data. The Ethernet interface module 306 belongs to a lowest-order layer in the interprocessor communication (IPC), and has an interface with the common application programming interface (API) module 302 and the message process module 304 above the module 306, and has an interface with an Ethernet device driver below the module 306.

The interprocessor communication (IPC) module performs data communication with other nodes using three basic interfaces to be described.

When data is transmitted to the Ethernet in the interprocessor communication (IPC), a function of "ip_sigsend (unsigned int ip_addr1, unsigned int ip_addr2, int peer_port1, int peer_port2, MSGPtr_t tx_ptr, unsigned char *tx_data, unsigned long pkt_size, int flag, unsigned char drup)" is used. If an interprocessor communication (IPC) send application programming interface (API) is called so that an application task (application program) 300 transmits the data, the interprocessor communication (IPC) module inputs an inputted destination address as a parameter, calls "ipc_get_ip ( )", and obtains a corresponding target value of "ip_address". If a structure pointer of "msgptr", a flag indicating a free message and a data type of "sig_jype" are inputted and "ip_sigsend" is called, the data is externally transmitted through the Ethernet device driver 308.

When a packet is transmitted to the Ethernet in the interprocessor communication (IPC), a function of "ip_pktsend (unsigned int ip_addr1, int peer_port1, MSGPtr_t tx_ptr, unsigned char *tx_data, unsigned long pkt_size, int flag)" is used. If the interprocessor communication (IPC) send application programming interface (API) is called so that an application task (application program) 300 transmits the packet, the interprocessor communication (IPC) module identifies a data type from a traffic type and calls the above-described "ip_sigsend ( )" if the data type is not frame data. The interprocessor communication (IPC) module inputs an inputted destination address as a parameter if the data type is frame data, calls "ipc_get_ip ( )", and obtains a corresponding target value of "ip_address". If a structure pointer of "msgptr", a flag indicating a free message and a data type of "sig_type" are inputted and "ip_pktsend" is called, the packet is externally transmitted through the Ethernet device driver.

When the Ethernet transmits data to the interprocessor communication (IPC) module, a function of "ip_pktrcv (NodeAddress_t node_addr, MSGPtr_t msgp, void *bufp, unsigned long pktlen, Traffic_t tr)" is used. When the Ethernet device driver 308 receives data, the function is called to transfer the data to the interprocessor communication (IPC) and a body part of the function is provided from the interprocessor communication (IPC) module. If the function of "ip_pktrcv" is called, the interprocessor communication (IPC) module determines, from a traffic type of "traffic_t", whether the received data is frame data or non-frame data. If the received data is the non-frame data, the data is queued in a structure provided from the interprocessor communication (IPC) module so that an interprocessor communication (IPC) receiver task can process the data. On the other hand, if the received data is the frame data, the received data is queued in a specific mailbox in the interprocessor communication (IPC) module.

In this embodiment, the interprocessor communication (IPC) module can have a data processing rate of a maximum 100 megabits per second (Mbps) using the Ethernet device driver 308. Further, when a node or a processor board is added, the node or the processor board can be added and connected to the network without separate equipment.

Hereinafter, a description will be given of Internet protocol (IP) table management for communication between processors or systems.

First, the case where a processor obtains its own Internet protocol (IP) address and an Internet protocol (IP) address of a software-loading server (wide area switching module 106) at the time of initially setting the processor, will be described. A dynamic host configuration protocol (DHCP) server daemon is driven in the loading server. If an Internet protocol (IP) address assignment request is received from a dynamic host configuration protocol (DHCP) client, the dynamic host configuration protocol (DHCP) server daemon selects an Internet protocol (IP) address from a corresponding Internet protocol (IP) pool and assigns the selected Internet protocol (IP) address to the dynamic host configuration protocol (DHCP) client. At this time, the loading server notifies the client of its own address. When the processor is initially set, the processor drives the dynamic host configuration protocol (DHCP) client and transmits a loading request message using the Internet protocol (IP) address of the server if the processor receives the Internet protocol (IP) address of the server and its own Internet protocol (IP) address assigned from the dynamic host configuration protocol (DHCP) server. Thus, the server transmits software appropriate for the processor in response to the loading request message. At this time, an Internet protocol (IP) table having Internet protocol (IP) address information of all processors contained in the system is simultaneously transmitted.

A corresponding processor receives the software and runs the received software to be operated. At this time, the processor stores the Internet protocol (IP) table having Internet protocol (IP) address information of all processors contained in the system, searches for an Internet protocol (IP) address in the Internet protocol (IP) table when a message is transmitted from corresponding software, and transmits the message to a corresponding processor of the searched Internet protocol (IP) address.

On the other hand, where a processor is added or deleted, the server identifies the fact that a processor is added or deleted, and transmits, to all processors, an updated Internet protocol (IP) table having updated Internet protocol (IP) address information based on the addition or deletion in the form of a message. A processor receiving the updated Internet protocol (IP) table updates its own Internet protocol (IP) table.

As described above, the present invention provides an apparatus and method for providing inter-processor communication (IPC), which can ensure flexibility of a system at the time of performing an external interface, improve market competitiveness of an IPC-related product according to its cost-effective configuration, and implement interprocessor communication (IPC) having various transmission rates according to media, by implementing the interprocessor communication (IPC) in an Ethernet environment using transmission control protocol/Internet protocol (TCP/IP).

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A system for providing inter-processor communication using transmission control protocol/Internet protocol in a communication system, the system comprising:

an access network controller (ANC); and a plurality of ethernet devices, wherein the ANC and the plurality of ethernet devices communicate with each other by transmission control protocol/Internet protocol through an Ethernet network, and wherein at least one of the ANC and the plurality of ethernet devices comprises:

an Ethernet interface module providing an interface between an Ethernet device driver and an inter-processor communication module, determining a type of a received message, transmitting the message when the determined type of the message is a first message, queuing the message in a first mailbox corresponding to a second message when the determined type of the message is the second message;

a message process module receiving the message transmitted by said Ethernet interface module, queuing the message received from said Ethernet interface module in a second mailbox corresponding to the first message; and a common application programming interface module providing an interface for performing data transmission and reception through said message process module, for management of the first and second mailboxes, for inter-processor communication buffer management, and for an inter-processor communication control function, said common application programming interface module being in communication with said Ethernet interface module and said message process module.

2. The system of claim 1, said message process module determining a number of messages queued in the second mailbox, deleting oldest messages from the second mailbox, and queuing latest messages in the second mailbox when the number of messages is greater than a predetermined number of messages.

3. The system of claim 1, said common application programming interface module, Ethernet interface module, and message process module communicating with each other in accordance with transmission control protocol/Internet protocol.

4. A system providing inter-processor communication using transmission control protocol/Internet protocol, the system comprising:

an access network controller being coupled to an Ethernet network and operating in accordance with software instructions corresponding to 1x evolution-data only (1xEV-DO);

a wide area switching module being coupled to the Ethernet network and performing operation and state management;

a data location register being coupled to the Ethernet network, performing subscriber management and providing session information to said access network controller;

an element management system being coupled to the Ethernet network and performing operation and management of the Ethernet network and said data location register;

a server being coupled to the Ethernet network and performing authentication for a 1x evolution-data only (1xEV-DO) subscriber; and an access network transceiver system transmitting 1x evolution-data only (1xEV-DO) data and signaling data to said access network controller through the Ethernet network;

said access network controller performing a matching function with said access network transceiver system for a packet data service, and performing call processing corresponding to 1x evolution-data only (1xEV-DO);

said access network controller, wide area switching module, and element management system communicating with each other by transmission control protocol/Internet protocol through the Ethernet network;

at least one communication subsystem;

wherein the communication subsystem comprising an Ethernet interface module providing an interface between an Ethernet device driver and an inter-processor communication module, the Ethernet device driver being communication with the Ethernet network, said Ethernet interface module determining a type of a received message, transmitting the message when the determined type of the message is a first message, queuing the message in a first mailbox corresponding to a second message when the determined type of the message is the second message;

a message process module receiving the message transmitted by said Ethernet interface module, queuing the message received from said Ethernet interface module in a second mailbox corresponding to the first message; and a common application programming interface module providing an interface for performing data transmission and reception through said message process module, for management of the first and second mailboxes, for inter-processor communication buffer management, and for an inter-processor communication control function, said common application programming interface module being in communication with said Ethernet interface module and said message process module, the inter-processor communication module being selected from among said access network controller, said wide area switching module, and said element management system.

5. The system of claim 4, said server corresponding to an access network-authorization, authentication, accounting server providing system management, an operator interface, and a graphic user interface for maintenance.

6. The system of claim 5, the system corresponding to an Internet protocol based evolution-data only (EV-DO) system.

7. The system of claim 6, said message process module determining a number of messages queued in the second mailbox, deleting oldest messages from the second mailbox, and queuing latest messages in the second mailbox when the number of messages is greater than a predetermined number of messages.

8. The system of claim 7, said common application programming interface module, Ethernet interface module, and message process module communicating with each other in accordance with transmission control protocol/Internet protocol.

9. The system of claim 8, the communication subsystem including software for transmitting and receiving the messages between application tasks in said access network controller, wide area switching module, and element management system.

10. A method providing inter-processor communication using transmission control protocol/Internet protocol in a communication system, the method comprising:

operating an access network controller in accordance with software instructions corresponding to 1x evolution-data only (1xEV-DO), the access network controller being coupled to an Ethernet network, the access network controller performing call processing corresponding to 1x evolution-data only (1xEV-DO);

performing operation and state management with a wide area switching module coupled to the Ethernet network;

performing subscriber management with a data location register coupled to the Ethernet network, the data location register providing session information to the access network controller;

performing operation and management of the Ethernet network and of the data location register with an element management system coupled to the Ethernet network;

performing authentication for a 1x evolution-data only (1xEV-DO) subscriber with a server coupled to the Ethernet network;

transmitting 1x evolution-data only (1xEV-DO) data and signaling data to the access network controller through the Ethernet network with an access network transceiver system, the access network controller performing a matching function with the access network transceiver system for a packet data service;

performing intercommunication between the access network controller, wide area switching module, and element management system by transmission control protocol/Internet protocol through the Ethernet network;

determining a type of a received message;

transmitting the message when the determined type of the message is a first message;

queuing the message in a first mailbox corresponding to a second message when the determined type of the message is the second message;

said determining, said transmitting, and said queuing of the message in the first mailbox being performed by an Ethernet interface module provided between an Ethernet device driver and an inter-processor communication module, the inter-processor communication module being selected from among the access network controller, the wide area switching module, and the element management system, the Ethernet device driver being communication with the Ethernet network;

receiving the message transmitted by the Ethernet interface module at a message process module;

queuing the message received from the Ethernet interface module in a second mailbox corresponding to the first message, said queuing of the message in the second mailbox being performed by the message process module; and providing a common application programming interface module for performing data transmission and reception through the message process module, for management of the first and second mailboxes, for inter-processor communication buffer management, and for an inter-processor communication control function, the common application programming interface module being in communication with the Ethernet interface module and the message process module.

11. The method of claim 10, the server corresponding to an access network-authorization, authentication, accounting server providing system management, an operator interface, and a graphic user interface for maintenance.

12. The method of claim 11, the communication system corresponding to an Internet protocol based evolution-data only (EV-DO) system.

13. The method of claim 10, further comprising:

determining a number of messages queued in the second mailbox;

deleting oldest messages from the second mailbox; and queuing latest messages in the second mailbox when the number of messages is greater than a predetermined number of messages, said determining of the number of messages queued in the second mailbox, said deleting of the oldest messages, and said queuing of the latest messages being performed by the message process module.

14. The method claim 13, the common application programming interface module, Ethernet interface module, and message process module communicating with each other in accordance with transmission control protocol/Internet protocol.

* * * * *